US011862139B2

(12) United States Patent
Pignier

(10) Patent No.: US 11,862,139 B2
(45) Date of Patent: Jan. 2, 2024

(54) METHOD AND SYSTEM FOR CREATING A PLURALITY OF SOUND ZONES WITHIN AN ACOUSTIC CAVITY

(71) Applicant: Faurecia Creo AB, Linköping (SE)

(72) Inventor: Nicolas Jean Pignier, Stockholm (SE)

(73) Assignee: Faurecia Creo AB, Linkoping (SE)

( * ) Notice: Subject to any disclaimer, the term of this patent is extended or adjusted under 35 U.S.C. 154(b) by 350 days.

(21) Appl. No.: 17/422,873

(22) PCT Filed: Jan. 14, 2020

(86) PCT No.: PCT/EP2020/050739
§ 371 (c)(1),
(2) Date: Jul. 14, 2021

(87) PCT Pub. No.: WO2020/148244
PCT Pub. Date: Jul. 23, 2020

(65) Prior Publication Data

US 2022/0068253 A1 Mar. 3, 2022

(30) Foreign Application Priority Data

Jan. 15, 2019 (SE) .................................... 1950036-2

(51) Int. Cl.
*H04R 3/12* (2006.01)
*G10K 11/178* (2006.01)
*H04S 7/00* (2006.01)

(52) U.S. Cl.
CPC .. *G10K 11/17854* (2018.01); *G10K 11/17857* (2018.01); *G10K 11/17883* (2018.01);
(Continued)

(58) Field of Classification Search
CPC ....... H04R 3/12; H04R 2499/14; H04S 7/301; H04S 7/302; G10K 11/17855
See application file for complete search history.

(56) References Cited

U.S. PATENT DOCUMENTS 8,126,159 B2 2/2012 Goose et al.
9,020,158 B2 4/2015 Wertz et al.
(Continued)

FOREIGN PATENT DOCUMENTS

DE 102014214699 A1 1/2016
EP 2597638 A1 5/2013
(Continued)

OTHER PUBLICATIONS

International Search Report and Written Opinion for International Application No. PCT/EP2020/050739, dated Feb. 24, 2020, (16 pages).

(Continued)

*Primary Examiner* — Ping Lee
(74) *Attorney, Agent, or Firm* — Kagan Binder, PLLC

(57) ABSTRACT

A method and a system for creating a plurality of sound zones within an acoustic cavity is provided. The method comprises: providing a plurality of actuators within the acoustic cavity, each for generating a respective acoustic output in response to a respective drive signal, providing, for each of the plurality of actuators, an adaptive filter for receiving a respective input signal, and generating a respective output signal, providing, for each of the adaptive filters, at least one filter coefficient, providing a plurality of error sensors within the acoustic cavity, each for generating a respective error signal e, representing a respective sound detected by the respective error sensor, providing an audio data signal x(n) for generating a desired sound in a desired sound zone of the plurality of sound zones, determining, for the desired sound zone, a set of actuator generation coefficients $kg_k$, a set of actuator exclusion coefficients $ke_k$, wherein k refers to a $k_{th}$ actuator, k=1, 2, 3 . . . , and a set of sensor weighting coefficients $me_m$ wherein m refers to a $m_{th}$ error sensor, m=1, 2, 3.

24 Claims, 8 Drawing Sheets

(52) U.S. Cl.
CPC ......... *G10K 11/17885* (2018.01); *H04R 3/12* (2013.01); *H04S 7/301* (2013.01); *H04S 7/302* (2013.01); *G10K 2210/1282* (2013.01); *G10K 2210/3046* (2013.01); *H04R 2499/13* (2013.01)

(56) References Cited

U.S. PATENT DOCUMENTS

| | | | |
|---|---|---|---|
| 9,591,420 | B2 | 3/2017 | Christoph et al. |
| 9,711,131 | B2 | 7/2017 | Christoph |
| 9,813,835 | B2 | 11/2017 | Christoph |
| 2010/0124337 | A1 | 5/2010 | Wertz et al. |
| 2017/0034623 | A1 | 2/2017 | Christoph et al. |
| 2018/0012589 | A1 | 1/2018 | MacNeille et al. |
| 2019/0014430 | A1 | 1/2019 | Christoph |

FOREIGN PATENT DOCUMENTS

| | | | |
|---|---|---|---|
| EP | 3232688 | A1 | 10/2017 |
| WO | 2011010147 | A1 | 1/2011 |
| WO | 2016008621 | A1 | 1/2016 |

OTHER PUBLICATIONS

Swedish Office Action and Search Report for Swedish Application No. 1950036-2, dated Jul. 22, 2019, (6 pages).

Kuo et al., "Active Noise Control: A Tutorial Review", Proceedings of the IEEE, vol. 87, No. 6, pp. 943-973, 1999, (31 pages).

Betlehem et al., "Personal Sound Zones: Delivering interface-free audio to multiple listeners", IEEE Signal Processing Magazine, vol. 32, No. 2, pp. 81-91, 2015, (11 pages).

Chung et al., "Adaptive Crosstalk Cancellation Using Common Acoustical Pole and Zero (CAPZ) Model-Common Pole Estimation", Convention paper 8578, AES Convention 131; Oct. 20-23, 2011, AES, New York, NY, USA, (9 pages).

E-Space English Abstract and Machine Translation for DE 102014214699 A1.

METHOD AND SYSTEM FOR CREATING A PLURALITY OF SOUND ZONES WITHIN AN ACOUSTIC CAVITY

CROSS-REFERENCE TO RELATED APPLICATIONS

This application claims priority to International Application No. PCT/EP2020/050739, filed Jan. 14, 2020 and titled “METHOD AND SYSTEM FOR CREATING A PLURALITY OF SOUND ZONES WITHIN AN ACOUSTIC CAVITY,” which in turn claims priority from a Swedish Patent Application having serial number 1950036-2, filed Jan. 15, 2019, titled “METHOD AND SYSTEM FOR CREATING A PLURALITY OF SOUND ZONES WITHIN AN ACOUSTIC CAVITY,” both of which are incorporated herein by reference in their entireties.

TECHNICAL FIELD

The present document relates to a method and system for creating a plurality of sound zones within an acoustic cavity. In particular, it relates to a method 5 and system for creating a plurality of individual sound zones within a vehicle cockpit.

BACKGROUND

Along with recent technological development, the time spent in a vehicle has become a mixed sound experience for the driver and the passengers. With the development of in-car connectivity, autonomous and shared driving, the vehicle cockpit is filled by chaotically mixed sounds, e.g., targeted vocal messages, hands-free calls, broadcastings from a vehicle audio system, individual screen programs, video games, voice messages of a navigation system, etc. Thus, an individual sound zone within a vehicle cockpit, in which each passenger/driver is able to choose his own audio content with a reduced disturbance, is desired.

Methods for creating individual sound zones or sound bubbles within an acoustic cavity have been widely studied, as one of the upcoming key audio developments for vehicles.

One method is to create a sound isolation between the different sound zones. For example, it is known that headrest speakers or directional speakers can be used to generate and control a localized sound in one sound zone. Cross-talk cancellation means can be added in another sound zone to reduce the unwanted noise which leaks from the one sound zone.

However, such localised solutions normally need to have the speakers and/or sensors placed within, or at least in a proximity of each sound zone. This arrangement of the speakers and/or sensors can be difficult to implement depending on the specific design of the acoustic cavity. If the speakers and/or sensors cannot be arranged on the optimal locations, the isolation effect will be degraded, and the disturbance cannot be reduced efficiently for certain sound zones.

Furthermore, such localised solutions cannot provide a wideband sound isolation since only when the wavelength of a sound is smaller than a distance between two sound zones, typically over 300 Hz, the localised solutions are effective. Thus, a certain part of the wideband sound will leak between the sound zones, which will undoubtedly degrade the sound isolation between the sound zones.

Thus, there is a need to provide a better sound isolation between the sound zones in order to generate an enhanced feeling of immersiveness for a person within each sound zone, e.g., the driver/passenger of the vehicle. There is also a need to provide a more flexible arrangement of the speakers and sensors within an acoustic cavity for creating a plurality of sound zones.

SUMMARY

It is an object of the present disclosure, to provide a new method and system for creating a plurality of sound zones within an acoustic cavity, which eliminates or alleviates at least some of the disadvantages of the prior art.

Further, there is another object of the present disclosure, to provide a new method and system for creating a plurality of sound zones within an acoustic cavity, which can improve, or at least complement the prior art.

The invention is defined by the appended independent claims. Embodiments are set forth in the appended dependent claims, and in the following description and drawings.

According to a first aspect, there is provided a method for creating a plurality of sound zones within an acoustic cavity. The method comprises: providing a plurality of actuators within the acoustic cavity, each for generating a respective acoustic output in response to a respective drive signal, providing, for each of the plurality of actuators, an adaptive filter for receiving a respective input signal, and generating a respective output signal, providing, for each of the adaptive filters, at least one filter coefficient, providing a plurality of error sensors within the acoustic cavity, each for generating a respective error signal e, representing a respective sound detected by the respective error sensor, providing an audio data signal x(n) for generating a desired sound in a desired sound zone of the plurality of sound zones, and providing, for the desired sound zone, a set of actuator generation coefficients $kg_k$, a set of actuator exclusion coefficients $ke_k$, wherein k refers to a $k_{th}$ actuator, k=1, 2, 3 . . . , and a set of sensor weighting coefficients $me_m$ wherein m refers to a $m_{th}$ error sensor, m=1, 2, 3 . . . Wherein each of the adaptive filters receives the provided audio data signal x(n) as the input signal, and generates a respective output signal y(n) based on the input signal and the at least one filter coefficient. The method further comprises providing, for each of the plurality of actuators, the respective drive signal for generating the respective acoustic output, comprising: generating a respective generation input signal, based on the set of actuator generation coefficients $kg_k$ and the provided audio data signal x(n); generating a respective exclusion input signal, based on the set of actuator exclusion coefficients $ke_k$ and the respective output signal y(n); generating the respective drive signal based on the respective generation input signal and the respective exclusion input signal. The method further comprises: generating, for each of the adaptive filters, at least one respective updated filter coefficient, comprising: generating a respective weighted error signal, based on the set of sensor weighting coefficients $me_m$ and the respective error signal e; generating a reference signal x'(n) based on the provided audio data signal x(n), the set of actuator exclusion coefficients $ke_k$, and a secondary sound path model $\hat{S}$ representing a plurality of acoustic transmission paths from each of the plurality of actuators to each of the plurality of error sensor; generating the respective updated filter coefficient based on the respective weighted error signal and the reference signal x'(n), to reduce the respective weighted error signal.

A sound zone may be a volume within the acoustic cavity, typically around a head or ears of a person. In a vehicle, the sound zone may be a volume corresponds to an individual seat position, e.g., a front seat position, a rear seat position.

An acoustic cavity may be a substantially closed volume, within which acoustic sounds can be transmitted and reflected, e.g., a cockpit of an automotive, a truck, a train or an airplane.

The provided audio data signal may be a signal representing a noise, e.g., a noise from an engine of a vehicle or a road noise.

Each adaptive filter may have one filter coefficient. Alternatively, each adaptive filter may have more than one filter coefficient. In the present application, more than one filter coefficient is provided for each adaptive filter.

In contrast to a medium frequency, typically from about 300 to 2000 Hz, or a high frequency, typically from about 2000 to 20000 Hz, part of a sound, a low frequencies part of the sound, typically from about 20 to 300 Hz, cannot be handled properly by the known methods, for the following reasons.

Firstly, the headrest speakers and directional speakers are not designed to work in the low frequency range.

Secondly, a low frequency sound has a larger wavelength in relation to a size of an acoustic cavity, e.g., a vehicle cockpit, comparing with the medium and high frequency sounds. Due to the larger wavelength, the low frequency sounds are coupled to acoustic resonances of the acoustic cavity and therefore are difficult to handle locally within a part of the acoustic cavity.

Consequently, the known individual sound zones in the acoustic cavity are merely narrowband sound zones, which comprises only the medium and high frequency sounds. The low frequency sounds are globally existing within the cavity. That is, the known individual sound zones don't have an individual low frequency sound.

The inventive concept is to create a plurality of sound zones within an acoustic cavity, such as a vehicle cockpit, wherein each sound zone is provided with an individual desired sound, including a low frequency sound.

The inventive concept comprises: 1) generating a low frequency (around 20 to 300 Hz) sound, or a low frequency part of a sound, for both a sound zone which needs the generated sound, e.g., a bright sound zone, and a sound zone which does not need it, e.g., a dark sound zone; and 2) cancelling or at least reducing the generated sound in the sound zone which does not need it. The inventive concept can be implemented by a plurality of distributed actuators and error sensors, a respective adaptive filter provided for each actuator. Coefficients may be used to control the contribution of each actuator and each sensor in generation and cancellation of a sound for each sound zone.

Thus, the low frequency sound, or the low frequency part of the sound can be individually created for at least two different sound zones within the acoustic cavity, by a global approach.

Since more than one actuator and error sensor may contribute to creating the individual sound zones, the actuators and error sensors do not need to be placed within or in a proximity of the sound zones. Thus, the arrangement of the actuators and/or error sensors can be more flexible.

Further, each sound zone within the acoustic cavity may be provided with an individual low frequency sound or an individual low frequency part of a sound. A feeling of immersiveness for the person within the sound zone will be enhanced, especially for music experiences.

Moreover, since the individual sound zones are created by a global approach instead of performing localised sound generation/cancellation for each sound zone, the sound leakages between different sound zones can be handled more efficiently such that a better sound isolation between different sound zones can be achieved.

The invention can be implemented in a vehicle cockpit, or any other acoustic cavity, wherein the notion of low frequencies is relative to the characteristic size of the acoustic cavity, such as a cockpit of an automobile, a truck, a train or an airplane.

The error sensor may be a microphone. The actuator may be a loudspeaker or a vibrating panel.

As the audio signals for different sounds are incoherent to each other and the processes involved are linear, assuming that the actuators work in their linear domain, several systems/methods can be superposed without interfering with each other. Thus, when a few bright sound zones are desired for different sounds, a plurality of systems may work in parallel for creating different sounds for the bright sound zones.

Active noise control (ANC) is a method known for reducing unwanted low frequency noise, e.g., an engine noise of a vehicle, and a road noise, by an addition of a second sound specifically designed to cancel the unwanted sound.

A typical ANC system in a vehicle comprises a controller, e.g., a digital signal processor (DSP), and a distributed system of actuators and sensors, whose positions and characteristics are selected for optimally performing in a low frequency range, typically from 20 to 300 Hz. The actuators may be loudspeakers or vibrating panels. The sensors may be microphones.

The unwanted sound can be described as a pressure wave having an amplitude and a phase. The ANC system can emit a wave with an equal amplitude, but a phase of 180°, i.e. an inverted phase, or anti-phase, of the unwanted wave, to cancel the unwanted wave.

Likewise, the system for creating a plurality of sound zones can work in parallel with any existing ANC system dedicated for controlling, e.g., an engine noise and/or a road noise, without interfering with the ANC system.

The method/system can also be used for active noise control. For example, the method/system can also be used for active noise control of an engine noise or a road noise.

At least one set of the set of actuator generation coefficients $kg_k$, the set of actuator exclusion coefficients $ke_k$, and the set of sensor weighting coefficients $me_m$, may be determined by an optimization process.

The optimization process may comprise: determining a plurality of monitor locations within the acoustic cavity; determining, for each of a plurality of acoustic transmission paths from each of the plurality of actuators to each of the plurality of monitor locations, a respective transfer function; wherein at least one monitor location may be arranged within each of the plurality of sound zones.

The transfer function may be a mathematical relation between a sound source and a response, e.g., from an actuator to a monitor location, or an error sensor. An acoustic transmission path therebetween can be fully characterised based the transfer function.

The optimization process may further comprise: providing a monitor sensor at each of the plurality of monitor locations, and determining the respective transfer function by measuring a response at the provided monitor sensor.

The monitor sensor may be a microphone.

Said determining the respective transfer function by measuring may comprise: driving at least one of the plurality of actuators with a signal, preferably a white or pink noise signal, and measuring a response by the provided monitor sensor.

The optimization process may comprise: determining the respective transfer function by simulation.

The optimization process may comprise: determining the set of actuator generation coefficients $kg_k$ for generating a first sound at a first monitor location arranged within the desired sound zone, wherein a first value representing the first sound may be greater than a first threshold. Preferably, the first value may be a squared pressure level of the first sound, expressed as $<d_{monitors}^2>_{\sigma_b}$.

The first threshold may be a value representing a minimal sound desired to be detected at a monitor location within the desire sound zone.

It is to determine the set of actuator generation coefficients $kg_k$ so that a loud enough sound can be generated in the desired sound zone.

Preferably, the set of actuator generation coefficients $kg_k$ may be determined to maximise the first value. That is, to make the first value as great as possible.

The optimization process may comprise: determining the set of actuator generation coefficients $kg_k$ for generating a second sound at a second monitor location arranged outside the desired sound zone, wherein a second value representing the second sound may be smaller than a second threshold. Preferably, the second value may be a squared pressure level of the second sound, expressed as $<d_{monitors}^2>_{\sigma_d}$.

The second threshold may be a value representing a maximal sound to be detected at a monitor location outside the desire sound zone.

It is to determine the set of actuator generation coefficients $kg_k$ so that a small enough sound can be generated outside the desired sound zone. That is, it is to generate less sound outside the desired sound zone, which needs to be cancelled.

Preferably, the set of actuator generation coefficients $kg_k$ may be determined to minimise the second value. That is, to reduce the second value to a smallest possible amount.

The optimization process may comprise: determining the set of actuator exclusion coefficients $ke_k$, and the set of sensor weighting coefficients $me_m$, by minimising the following function $$<e_{monitors}^2>_{\sigma_d}+\alpha<|e_{monitors}-d_{monitors}|^2>_{\sigma_b}.$$

Wherein $<e_{monitors}^2>_{\sigma_d}$ may refer to a squared pressure level of a third sound outside the desired sound zone, generated by the plurality of the actuators. $\alpha<|e_{monitors}-d_{monitors}|^2>_{\sigma_b}$ may refer to a squared pressure level difference between a fourth sound within the desired sound zone and the first sound within the desired sound zone. $\alpha$ may be a weighting factor, which is a positive real number. Preferably, $\alpha$ may be a value within a range 0.1-10, more preferably 0.5-2.

The third sound may represent a resulting sound generated outside the desired sound zone, by the plurality of the actuators. That is, the third sound may be undesired, which needs to be cancelled or at least reduced. Thus, minimising $<e_{monitors}^2>_{\sigma_d}$ means to minimise the resulting sound generated outside the desired sound zone.

$\alpha<|e_{monitors}-d_{monitors}|^2>_{\sigma_b}$ may represent an amount of a sound reduction in the desired sound zone, caused by a sound generated for cancelling the third sound. Thus, minimising $\alpha<|e_{monitors}-d_{monitors}|^2>_{\sigma_b}$ means to keep the sound reduction in the bright zone as little as possible.

$\alpha$ may be a coefficient that weighs the two aspects.

The method for creating a plurality of sound zones within an acoustic cavity may further comprise providing, for each of the plurality of sound zones, a respective set of actuator generation coefficients $kg_k$, a respective set of actuator exclusion coefficients $ke_k$, and a respective set of sensor weighting coefficients $me_m$.

At least one set of the provided set of actuator generation coefficients $kg_k$, the set of actuator exclusion coefficients $ke_k$, and the set of sensor weighting coefficients $me_m$, may be stored in a storage unit.

The storage unit may be provided within or outside the acoustic cavity.

The method for creating a plurality of sound zones within an acoustic cavity may further comprise providing a respective static filter for receiving the provided audio data signal x(n), and generating a respective filtered signal in response to the provided audio data signal x(n). Each of the adaptive filters may receive the respective filtered signal as the input signal, and may generate a respective output signal y(n) based on the input signal and the at least one filter coefficient.

Each of the adaptive filters may comprise a respective static filter, for receiving the provided audio data signal x(n), and generating a respective filtered signal in response to the provided audio data signal x(n). Each of the adaptive filters may receive the respective filtered signal as the input signal, and may generate a respective output signal y(n) based on the input signal and the at least one filter coefficient.

The respective static filter may be determined by a calibration or by a simulation.

The respective generation input signal may be generated by applying the set of actuator generation coefficients $kg_k$ to the provided audio data signal x(n).

The respective exclusion input signal may be generated by applying the set of actuator exclusion coefficients $ke_k$ to the respective output signal y(n).

The respective weighted error signal may be generated by applying the set of sensor weighting coefficients $me_m$ to the respective error signal e.

The reference signal x'(n) may be generated by applying the secondary sound path model $\hat{S}$, and applying the set of actuator exclusion coefficients $ke_k$ to the provided audio data signal x(n), $$x'(n)=ke_k\hat{S}*x.$$

The provided audio data signal x(n) may have a frequency range of to 400 Hz, preferably 20-300 Hz, more preferably 30-200 Hz, most preferably 50-150 Hz.

The generated at least one respective updated filter coefficient at a time step n+1 may be expressed as $$W_k(n+1)=W_k(n)-\mu\sum_{m=1}^{M}x'_{km}(n)e'_m(n).$$

Wherein $W_k(n)$ may represent the respective filter coefficient at a time step n. $x'_{km}(n)$ may represent a reference audio signal. $e'_m(n)$ may represent the weighted error signal. $\mu$ may be a step size.

The reference signal $x'_{km}(n)$ may be generated based on the provided audio data signal x(n), the set of actuator exclusion coefficients $ke_k$, and the secondary sound path model S.

The reference signal $x'_{km}(n)$ may be expressed as:

$$x'_{km}=ke_k\hat{S}_{km}*x.$$

The method for creating a plurality of sound zones within an acoustic cavity may further comprise updating at least one set of the set of actuator generation coefficients $kg_k$, the set of actuator exclusion coefficients $ke_k$, and the set of sensor weighting coefficients $me_m$, for the desired sound zone.

Said updating may be performed by a learning process.

According to a second aspect, there is provided a system for creating a plurality of sound zones within an acoustic cavity. The system comprises: a plurality of actuators within the acoustic cavity, each configured to generate a respective acoustic output in response to a respective drive signal, an adaptive filter operatively connected to each of the plurality of actuators, configured to receive a respective input signal, and generate a respective output signal, wherein each of the adaptive filters is provided with at least one filter coefficient, a plurality of error sensors within the acoustic cavity, each configured to generate a respective error signal e, representing a respective sound detected by the respective error sensor, a control unit, configured to: receive an audio data signal x(n) for generating a desired sound in a desired sound zone of the plurality of sound zones, provide, for the desired sound zone, a set of actuator generation coefficients $kg_k$, a set of actuator exclusion coefficients $ke_k$, wherein k refers to a $k_{th}$ actuator, k=1, 2, 3 . . . , and a set of sensor weighting coefficients $me_m$ wherein m refers to a $m_{th}$ error sensor, m=1, 2, 3 . . . ; wherein each of the adaptive filters is configured to receive the provided audio data signal x(n) as the input signal, and to generate a respective output signal y(n) based on the input signal and the at least one filter coefficient. The control unit is further configured to: provide, for each of the plurality of actuators, the respective drive signal for generating the respective acoustic output, wherein the control unit is further configured to: generate a respective generation input signal, based on the set of actuator generation coefficients k g k and the provided audio data signal x(n); generate a respective exclusion input signal, based on the set of actuator exclusion coefficients $ke_k$ and the respective output signal y(n); generate the respective drive signal based on the respective generation input signal and the respective exclusion input signal. The control unit is further configured to: generate, for each of the adaptive filters, at least one respective updated filter coefficient, wherein the control unit is further configured to: generate a respective weighted error signal, based on the set of sensor weighting coefficients $me_m$ and the respective error signal e; generate a reference signal x'(n) based on the provided audio data signal x(n), the set of actuator exclusion coefficients $ke_k$, and a secondary sound path model $\hat{S}$ representing a plurality of acoustic transmission paths from each of the plurality of actuators to each of the plurality of error sensor; generate the respective updated filter coefficient based on the respective weighted error signal and the reference signal x'(n), to reduce the respective weighted error signal.

The actuator may be a loudspeaker, or a vibrating panel. The error sensor may be a microphone.

DESCRIPTION OF EMBODIMENTS

Figure 1:
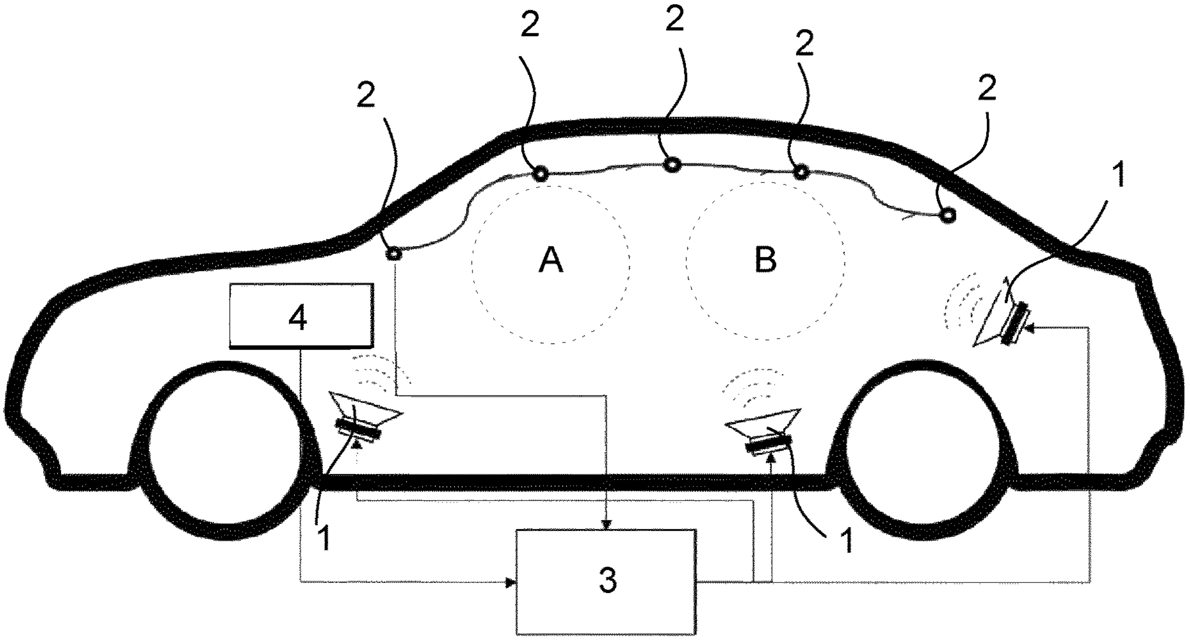
FIG. 1 is a schematic view of a system for creating a plurality of sound zones within a car cockpit.

FIG. 1 is a schematic view of a system for creating a plurality of sound zones within a car cockpit. As shown in FIG. 1, the system comprises a control unit 3, three actuators 1 in the form of loudspeakers, and five error sensors 2 in the form of microphones.

The control unit 3 may comprise a processor, a DSP, a CPU. The control unit 3 may comprise a storage unit (not shown).

FIG. 1 also shows an audio unit 4 for providing an audio data signal for generating a desired sound in a desired sound zone of the plurality of sound zones. The audio unit 4 may be an in-vehicle infotainment (IVI) system or an In-car entertainment (ICE) system.

The IVI/ICE system may refer to a vehicle system that combines entertainment and information delivery to drivers and passengers. The IVI/ICE system may use audio/video (A/V) interfaces, touchscreens, keypads and other types of devices to provide these types of services.

The control unit 3 and the audio unit 4 may be two separate units, as shown in FIG. 1. Alternatively, the control unit 3 and the audio unit 4 may be combined as one unit. For example, the control unit 3 may be implemented in the audio unit 4.

In FIG. 1, all the error sensors 2 are connected in series to the control unit 3. The actuators 1 are connected in parallel to the control unit 3. However, these ways of connections shown in FIG. 1 are only examples for illustration. For example, at least two of the error sensors 2 may be connected in parallel to the control unit 3. For example, at least two of the actuators 1 may be connected in series to the control unit 3. Any one of the connection links between the error sensors 2, between the actuators 1, between the control unit 3 to an actuator 1, or to an error sensor 2, may be wired or wireless.

A sound zone may be a volume within an acoustic cavity. For example, a sound zone may be a volume around a head and/or an ear of a driver or a passenger. Sound zones within a vehicle cockpit may correspond to different seating positions or a group of seating positions in the vehicle.

A bright sound zone may be a sound zone, in which a provided sound is desired to be heard by a person, e.g., a driver or a passenger, within the sound zone.

The volume outside the bright sound zone may be one or a plurality of different dark sound zone(s), in which the provided sound is undesired and not want to be heard by a person within the dark sound zone(s).

In FIG. 1, there are two different sound zones A, B. The bright sound zone A is located at a front seat position and the dark sound zone B is located at a rear seat position. Examples of different bright and dark sound zones are shown in FIG. 2.

Figure 2A:
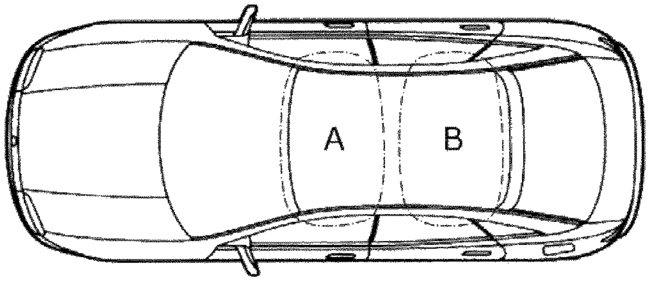
FIGS. 2*a*-2*d* are examples of different sound zones within a car cockpit.

In FIG. 2*a*, the bright sound zone A is located at the front seats position and the dark sound zone B is located at the rear seats position.

Figure 2B:
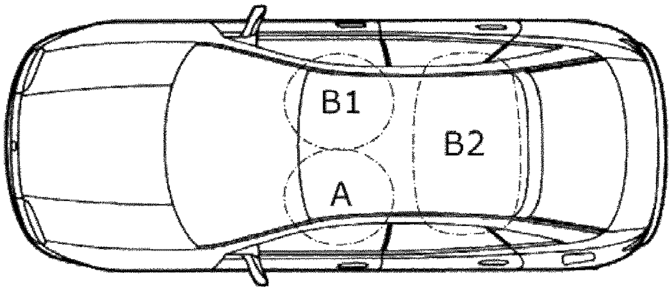

In FIG. 2*b*, the bright sound zone A is located at the front left seat position. The first dark sound zone B1 is located at the front right seat position. The second dark sound zone B2 is located at the rear seats position.

Figure 2C:
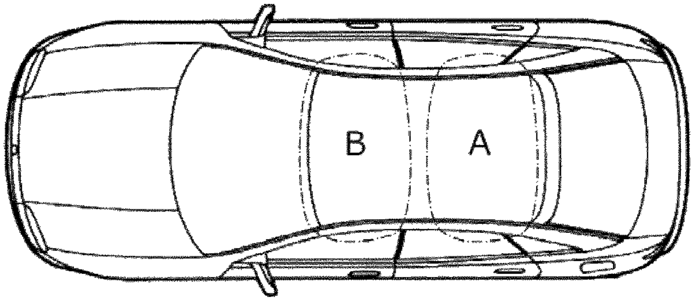

In FIG. 2*c*, the bright sound zone A is located at the rear seats position and the dark sound zone B is located at the front seats position.

Figure 2D:
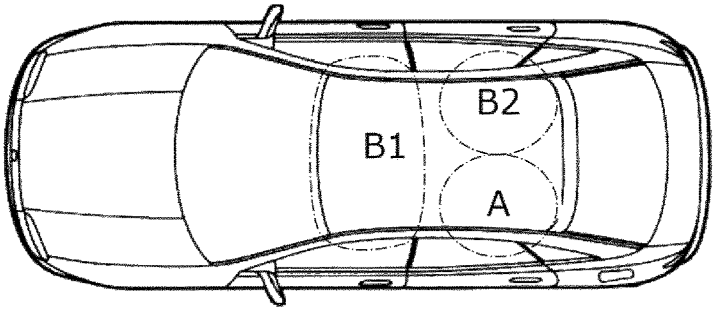

In FIG. 2*d*, the bright sound zone A is located at the rear left seat position. The first dark sound zone B1 is located at the front seats position. The second dark sound zone B2 is located at the rear right seat position.

The provided sound is only desired to be heard by the person within the bright sound zone A. Under ideal conditions, it is desired that the persons within the dark sound zone(s) B, B1, B2, cannot hear the provided sound. However, in implementations, it is sufficient to keep a sound pressure level of the provided sound in the dark sound zone(s) as little as possible.

It is known that sound pressure level (SPL) or acoustic pressure level is a logarithmic measure of an effective pressure of a sound relative to a reference value. The sound pressure level, or shorted as pressure level, is typically measured in dB.

A difference in a pressure level between the bright and dark sound zone can be quantified in terms of a contrast, typically expressed as:

$$\text{Contrast} = 10\log\left(\frac{\langle e^2\rangle_{bright}}{\langle e^2\rangle_{dark}}\right),$$

wherein $\langle e^2\rangle_{bright}$ and $\langle e^2\rangle_{dark}$ represent an average squared pressure level in the bright and dark sound zone, respectively.

In the present application, $\sigma_b$ and $\sigma_d$ are sometimes used for referring to the bright and the dark sound zone, respectively. The following description is written for an audio signal provided to generate a desired sound in a bright sound zone and the notation $\sigma_b$ is sometimes omitted.

Various perceptual experiments have indicated that a required contrast between the bright and the dark sound zone should be between 10 to 40 dB. The experiments can be found, for example in Francombe, J., Mason, R., Dewhirst, M., and Bech, S. (2012). "*Determining the threshold of acceptability for an interfering audio programme*," in *Proceedings of the* 132*nd AES Convention*, Budapest, Hungary, 26-29 Apr. 2012; and Baykaner, K., Hummersone, C., Mason, R., and Bech, S. (2013). "*The prediction of the acceptability of auditory interference based on audibility*," in *Proceedings of the 52nd AES International Conference* Guildford, UK, 2-4 Sep. 2013.

Thus, in order to achieve a larger contrast, it is desired to have as little pressure level as possible in the dark sound zone $\sigma_d$. That is, the dark sound zone $\sigma_d$ should have as little sound leaking from the bright zone as possible.

Figure 3:
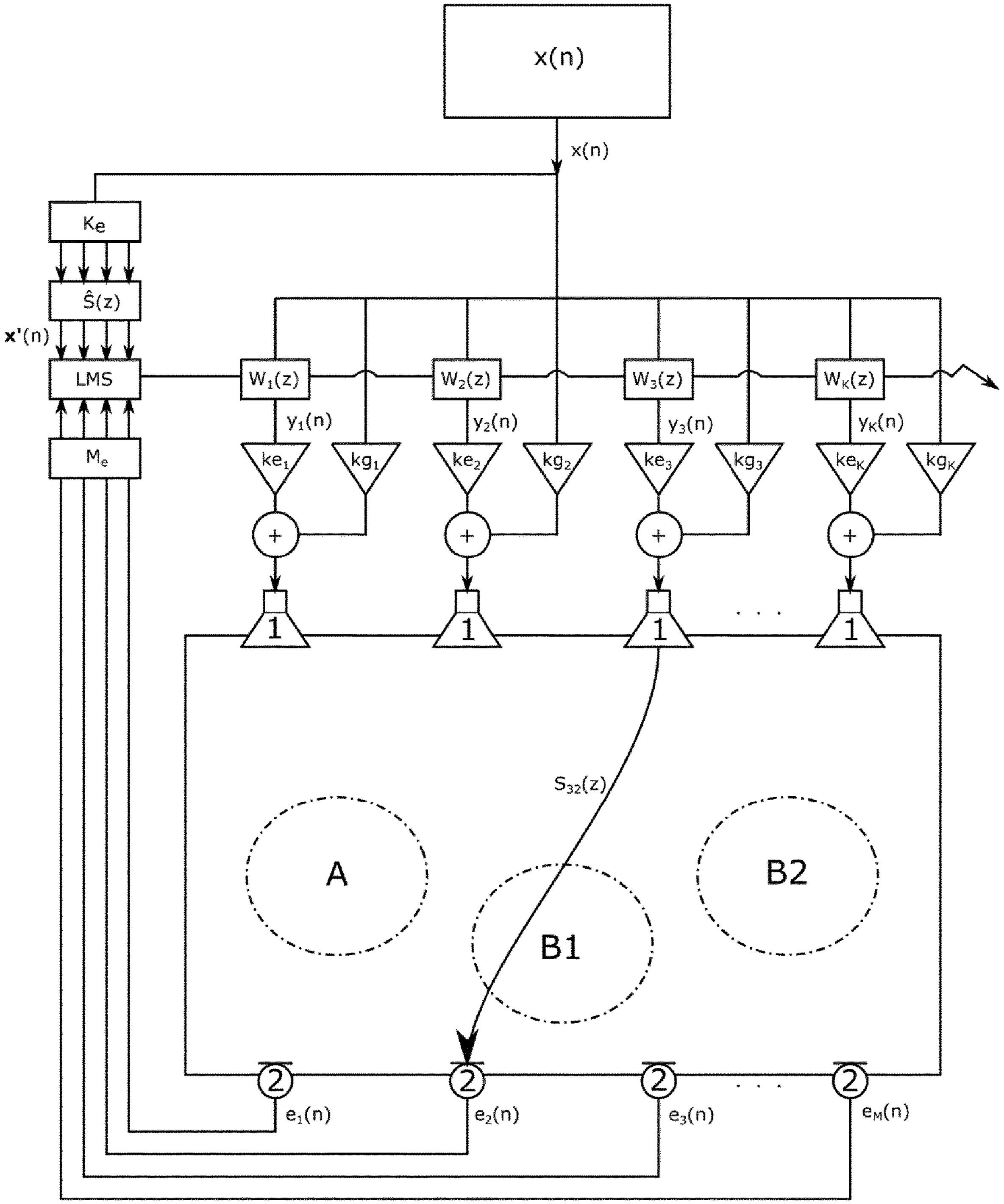
FIG. 3 is an example of a diagram of a method for creating a plurality of sound zones within an acoustic cavity.

FIG. 3 is a diagram of a method for creating a plurality of sound zones within an acoustic cavity.

The audio data signal x(n)=[x, x, . . . , x] is provided for generating a desired sound in the bright sound zone A. That is, the provided audio data signal is the same for each one of the actuators 1 and the adaptive filters.

Actuator Generation Coefficients $kg_k$:

A set of actuator generation coefficients $kg_k$ can be used for controlling the actuators 1 to generate a desired sound in the bright sound zone A, while not generating excessive sounds in the dark sound zones B1, B2.

For each of the plurality of actuators 1, a respective generation input signal may be generated based on the set of actuator generation coefficients $kg_k$ and the provided audio data signal x(n).

The set of actuator generation coefficients $kg_k$ may be in the form of an actuator generation matrix $K_g$ comprising a plurality of actuator generation coefficients $kg_k$, wherein k is the number of actuators.

The actuator generation matrix $K_g$ may be a diagonal matrix. A main diagonal, also known as a principal diagonal, a primary diagonal, a leading diagonal, or a major diagonal, of a matrix M is a collection of elements $M_{i,j}$ wherein i equals to j (i=j). All off-diagonal elements are zero in a diagonal matrix. That is, the actuator generation matrix $K_g$ may be a diagonal matrix, wherein the coefficients $kg_k$ outside the main diagonal are all zeros (0s).

An example of the actuator generation matrix $K_g$ may be $$K_g(\sigma_b) = \begin{bmatrix} kg_1(\sigma_b) & \dots & 0 \\ \vdots & \ddots & \vdots \\ 0 & \dots & kg_K(\sigma_b) \end{bmatrix}$$

The set of actuator generation coefficients $kg_k$ are chosen so that the expression $[S]K_g x$ can result in a desired sound in the bright sound zone A, while no excessive sounds in the dark sound zones B1, B2. [S] represents applying a respective secondary path from a respective actuator 1 to a respective error sensor 2.

Since the generated sound is desired in the bright sound zone A and undesired in the dark sound zones B1, B2, the generated sound is a disturbance sound in the dark zones B1, B2.

The actuators 1 may be lowly directive at low frequencies (about 20 to 300 Hz). Thus, it is not possible to generate a low frequency sound selectively in the bright sound zone A without exciting the whole acoustic cavity, including the dark sound zones B1, B2. It is however unnecessary to generate excessive sound in the dark sound zones B1, B2.

In a simple form, the actuator generation coefficients $kg_k$ may only consist of zeros (0s) and ones (1s). An actuator generation coefficient being equal to zero (0) means that an actuator is not contributed in the generation of the desired sound in the bright sound zone A. That is, this actuator is not used for generating the desired sound in the bright sound zone A. An actuator generation coefficient being equal to one (1) means that an actuator is 100% contributed in the generation of the desired sound in the bright sound zone A.

Thus, a subset of actuators may be selected for the generation of the desired sound in the bright sound zone A, by applying the coefficients $kg_k$ to the actuators 1.

In a complex form, the coefficients $kg_k$ may be any real number.

Actuator Exclusion Coefficients $Ke_k$:

A set of actuator exclusion coefficients $ke_k$ can be used for controlling the contribution of the actuators in cancelling the disturbance sound in the dark sound zones B1, B2, which is generated along with the generation of the desired sound in the bright sound zone A. The set of actuator exclusion coefficients $ke_k$ can be used for keeping the desired sound in the bright sound zone A unchanged as much as possible, in order to create a larger contrast between the bright sound zone A and dark sound zones B1, B2.

Each of the adaptive filters receives the provided audio data signal x(n) as the input signal, and generates a respective output signal y(n) based on the input signal x(n) and the filter coefficient of the filter $W_k(z)$. Wherein z is a notation referring to a z-transform. For each of the plurality of actuators 1, a respective exclusion input signal may be generated based on the set of actuator exclusion coefficients $ke_k$ and the respective output signal y(n).

For each of the plurality of actuators 1, a respective drive signal may be generated based on the respective generation input signal and the respective exclusion input signal, such that each of the plurality of actuators 1 may generate a respective acoustic output in response to the respective drive signal.

The generated acoustic output may be transmitted within the acoustic cavity to provide an individual sound in each sound zone.

The set of actuator exclusion coefficients $ke_k$ may be in the form of an actuator exclusion matrix $K_e$ comprising a plurality of coefficients $ke_k$, each for controlling one of the plurality of actuators 1.

The actuator exclusion matrix $K_e$ may be a diagonal matrix. The coefficients $ke_i$ outside the main diagonal may all be zeros (0s).

The actuator exclusion coefficients $ke_k$ on the main diagonal may be chosen so that a minimum squared value of a pressure level of a sound can be generated at a monitor location in the dark sound zones B1, B2, while keeping as much as possible the desired signal amplitude at a monitor location in the bright sound zone A.

An example of the actuator exclusion matrix $K_e$ may be $$K_e(\sigma_b) = \begin{bmatrix} ke_1(\sigma_b) & \dots & 0 \\ \vdots & \ddots & \vdots \\ 0 & \dots & ke_K(\sigma_b) \end{bmatrix}$$

The actuator exclusion coefficient $ke_k$ may be zero (0), one (1), or any other real number.

Error Signals e:

The error signals $e=[e_1, e_2, \dots, e_M]$ are generated by the plurality of the error sensors 2, each representing a respective sound detected by the respective error sensor 2. M represents the number of the error sensors.

Each error signal is a sum of two different components. The first component is a disturbance signal, also known as a primary error signal in the active noise control theory. The second component is a cancelling signal, often known as a secondary error signal in the active noise control theory. In the dark sound zones, the disturbance signal is to be reduced as much as possible by the cancelling signal at the error sensor.

The ideal situation is that the two components are totally cancelled by each other, to result in the error signal as zero. However, in implementations, it is sufficient to keep an error signal as little as possible, i.e. to achieve a minimum error signal.

The disturbance signal may be resulted by the respective generation input signal, which is generated based on the set of actuator generation coefficients $kg_k$ and the provided audio data signal x(n). The disturbance signal can be represented by the expression $[S]K_gx$, wherein [S] represents applying the respective secondary path from the actuator 1 to the error sensor 2. For example, $S_{32}$ refers to a secondary path from the third actuator to the second error sensor, as shown in FIG. 3.

The cancelling signal may be resulted by the respective exclusion input signal, which is generated based on the set of actuator exclusion coefficients $ke_k$ and the respective output signal y(n). The cancelling signal can be represented by the expression $[S]K_ey$, wherein [S] represents applying the respective secondary path from the actuator to the error sensor.

The error signal may be represented by the expression:

$$e=[S]K_gx+[S]K_ey$$

Sensor Weighting Coefficients $me_m$

A set of sensor weighting coefficients $me_m$, may be used for controlling the contribution of each error sensor for reducing the disturbance sound in the dark sound zones B1, B2, which is generated along with the generation of the desired sound in the bright sound zone A.

A respective weighted error signal may be generated, based on the set of sensor weighting coefficients $me_m$, and the respective error signal e.

The weighted error signal can be expressed as:

$$e_m'=m_ee_m$$

The set of sensor weighting coefficients $me_m$ may be in the form of a sensor weighting matrix $M_e$ comprising a plurality of sensor weighting coefficients $me_m$. The subscript m represents the number of the error sensors.

The sensor weighting matrix $M_e$ may be a diagonal matrix. The sensor weighting coefficients $me_m$ outside the main diagonal may all be zeros (0s).

The coefficient $me_m$ may be zero (0), one (1), or any other real number.

An example of the sensor weighting coefficients $M_e$ may be $$M_e(\sigma_b) = \begin{bmatrix} me_1(\sigma_b) & \dots & 0 \\ \vdots & \ddots & \vdots \\ 0 & \dots & me_M(\sigma_b) \end{bmatrix}$$

The weighted error signal may also be expressed as:

$$M_ee=M_e[S]K_gx+M_e[S]K_ey$$

Update of the Filters $W_k(z)$:

The filter $W_k(z)$ associated to the actuator k may be updated by a standard Least Mean Square (LMS) method, or a standard Filtered Least Mean Square (FXLMS) method, described in e.g., Kuo, Active Noise Control Systems, Sen M. Kuo and Dennis Morgan. 1995. *Active Noise Control Systems: Algorithms and DSP Implementations* (1st ed.). John Wiley & Sons, Inc., New York, NY, USA.

A respective updated filter may be generated in order to reduce the respective weighted error signal, or the respective error signal. The updated filter may be the filter provided with at least one updated filter coefficient.

The respective updated filter coefficient may be generated based on the respective weighted error signal and a reference signal $x'_{km}(n)$, to reduce the respective weighted error signal.

The filter $W_k(z)$ at a time step n can be expressed as:

$$W_k(n)=[w_{k,0}(n)\ w_{k,1}(n)\ \dots\ w_{k,L_w-1}(n)]^T$$

Here the filter $W_k(z)$ is provided with more than one filter coefficient. Alternatively, the filter $W_k(z)$ may be provided with only one filter coefficient. Wherein $w_{k,i}$ are the filter coefficients of the filter $W_k$. The updated filter $W_k(z)$ at a time step n+1 can be expressed as:

$$W_k(n+1) = W_k(n) - \mu\sum_{m=1}^{M} x'_{km}(n)e'_m(n),$$

wherein $x'_{km}(n)$ represents a reference audio signal;

$e'_m(n)$ represents the weighted error signal; and

μ is a step size.

The weighted error signal $e'_m(n)$ may be obtained by application of the set of sensor weighting coefficients $me_m$ to the error signal $e_m$.

The reference signal $x'_{km}(n)$ may be generated based on the provided audio data signal x(n), the set of actuator exclusion coefficients $ke_k$, and the secondary sound path model $\hat{S}$ representing acoustic transmission paths between each of the plurality of actuators 1 and each of the plurality of error sensor 2. The reference signal $x'_{km}(n)$ can be expressed as:

$$x'_{km}=ke_k\hat{S}_{km}*m$$

The step size μ may be a positive real number. The step size μ may have a small magnitude relative to the filter coefficients. The step size μ may be determined based on an amplitude of the audio data signal x(n). A typical value of μ may be between 0 and 1.

If the step size μ is set to zero and the initial value of the filter coefficients of the filter $W_k(z)$ for each adaptive filter is set to be zero, then the adaptive filter is not actively involved in the system/method.

Figure 4:
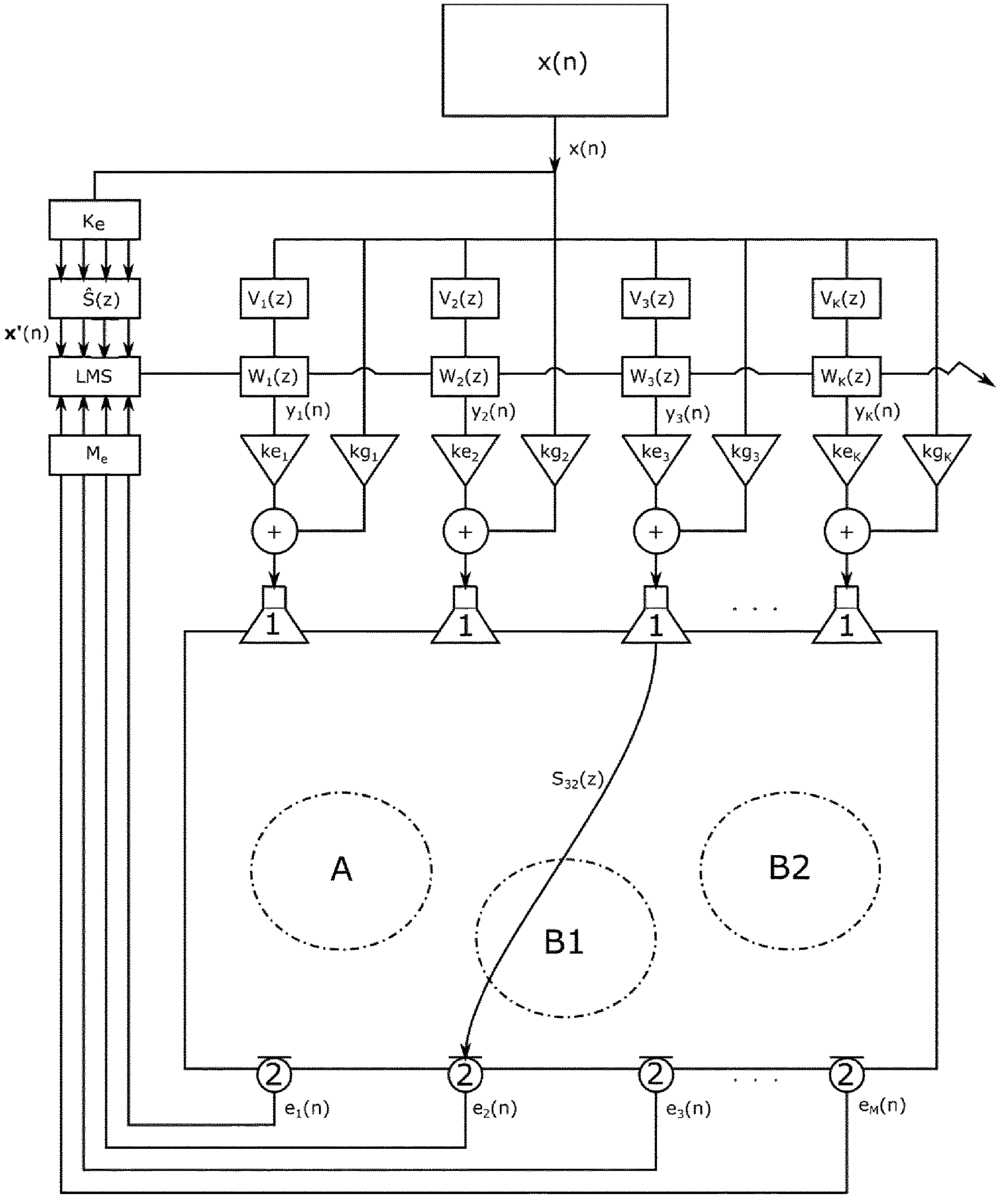
FIG. 4 is an example of a diagram of a method for creating a plurality of sound zones within an acoustic cavity.

Filters $V_k(z)$:

FIG. 4 is another example of a method for creating a plurality of sound zones within an acoustic cavity.

Comparing with the diagram of FIG. 3, a respective static filter $V_k$ is provided for each adaptive filter. The method according to FIG. 4 further comprises providing a respective static filter for filtering the provided audio data signal x(n), and generating a respective filtered signal in response to the provided audio data signal x(n). Each of the adaptive filters receives the respective filtered signal as the input signal, and generates a respective output signal y(n) based on the input signal and the filter coefficients.

The respective static filter $V_k$ may be an independent filter outside the respective adaptive filter.

As the static filter $V_k$ is a static filter, the formulation for updating the filter coefficients of the filter $W_k(z)$ may remain the same. That is, even with the static filter $V_k$ in the system, the updated filter $W_k(z)$ at the time step n+1 can still be expressed as:

$$W_k(n+1) = W_k(n) - \mu\sum_{m=1}^{M} x'_{km}(n)e'_m(n),$$

The static filters $V_k(z)$ may be defined as a converged solution of the adaptive filter used in the method of FIG. 3 for a broadband audio data signal x(n), e.g., a broadband noise, in the frequency range of interest. Wherein z is a notation referring to the z-transform.

The static filter $V_k$ may be a vector of filter coefficients $[V_{k,0}, V_{k,1}, \dots]$ of the same length as the filter $W_k$.

A broadband noise, also known as a wideband noise, is a noise signal whose energy is present over a wide audible range of frequencies, as opposed to a narrowband noise.

Providing the static filter $V_k$, as shown in FIG. 4, may make the filter coefficients of the filter $W_k(z)$ tend to be zero (0) for the broadband audio data signal x(n). Thus, the method of FIG. 4 may be adapted for any broadband audio data signal x(n) with similar statistical characteristics as the data signal used to determine the static filters $V_k(z)$.

The static filters $V_k(z)$ may be derived offline, e.g. during a calibration.

Alternatively, the static filters $V_k(z)$ may be derived by simulation based on the secondary path model $\hat{S}$ representing the acoustic transmission paths from each of the plurality of actuators 1 and each of the plurality of error sensor 2. During a simulated calibration, the acoustic transmission paths from each actuator to each error sensor may be simulated based on the secondary path model $\hat{S}$.

The static filters $V_k(z)$ may be the same or different for each sound zone.

If the step size μ is set to zero and the filter coefficient of the filter $W_k(z)$ for each adaptive filter is set to be zero, then the adaptive filter is not actively involved in the system/method, and only the static filters $V_k(z)$ are involved.

Figure 5A:
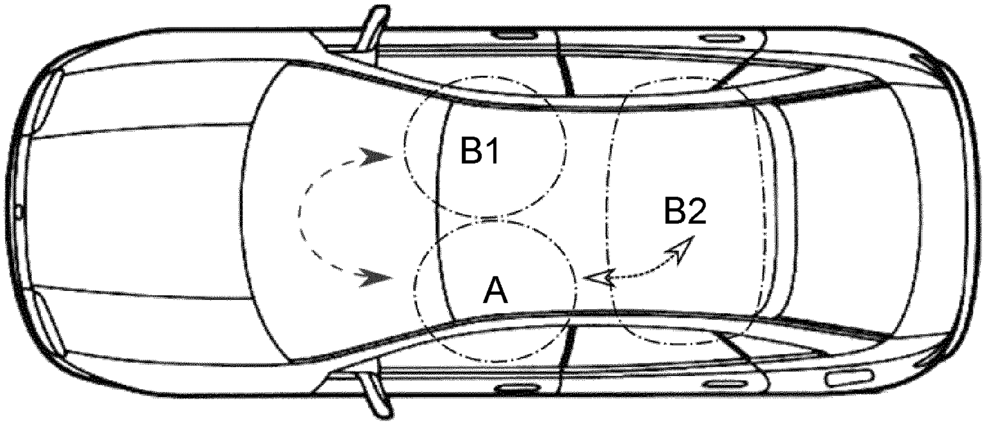
FIG. 5*a* is an example of different sound zones within a car cockpit.

In FIG. 5*a*, the bright sound zone A is at the left front seat position, i.e. the driver's position. The two dark sound zones B1, B2 are at the front and rear passenger's position, respectively.

Figure 5B:
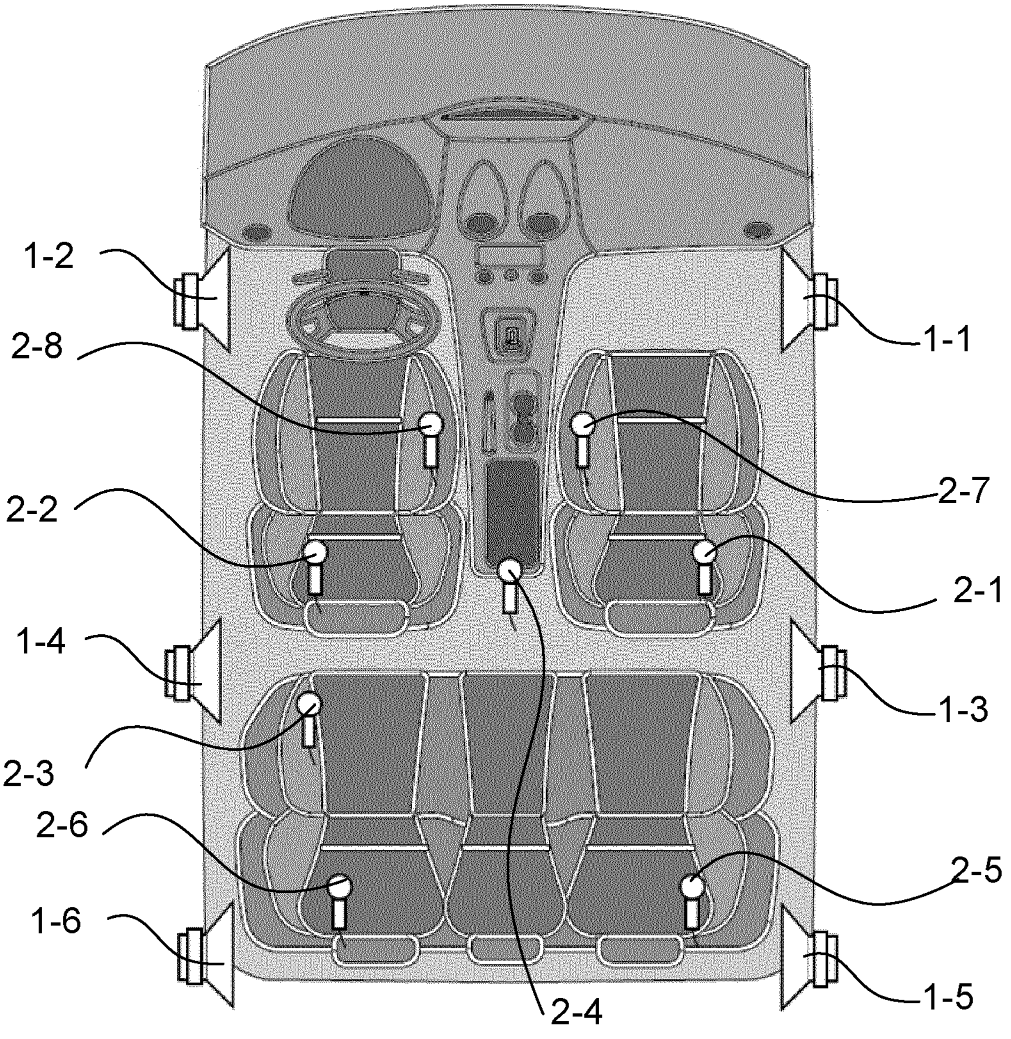
FIG. 5*b* is an example of arrangement of actuators and error sensors in the car cockpit of FIG. 5*a*.

FIG. 5*b* shows an example of the arrangement of the actuators and the error sensors in the car cockpit of FIG. 5*a* for creating a plurality of sound zones. Six actuators 1-1, 1-2, . . . ,1-5, 1-6, and eight error sensors 2-1, 2-2, . . . , 2-7, 2-8, are arranged within the car cockpit.

Figure 5C:
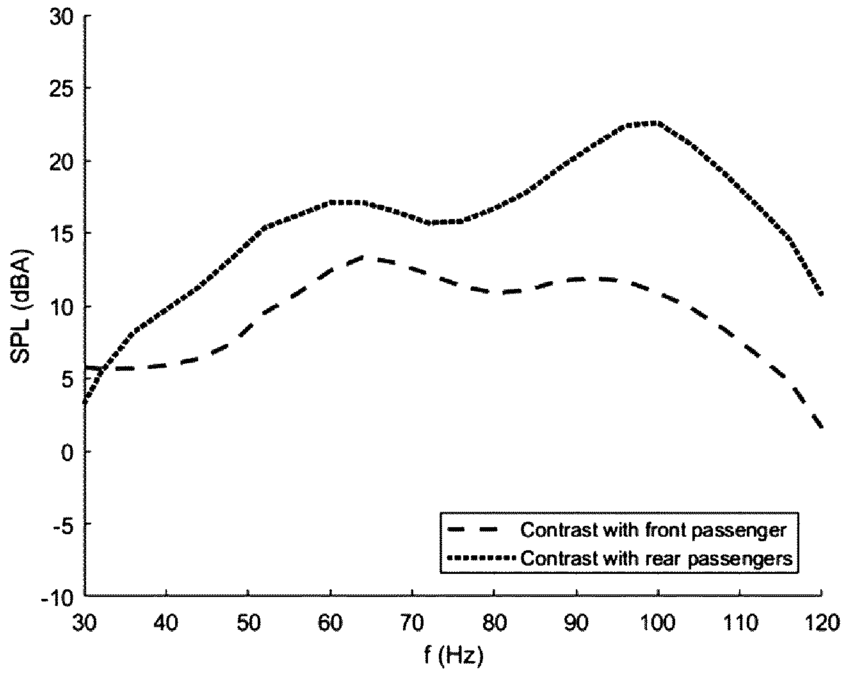
FIG. 5*c* is a simulation result of a contrast in sound level between a driver sound zone and a front/rear passenger(s) sound zone in FIG. 5*a*.

FIG. 5*c* shows a simulation result of a contrast in sound pressure levels between the bright sound zone A and dark sound zones B1, B2, respectively, created by the method and the system using the actuators and error sensors arranged according to FIG. 5*b*, for a broadband audio data signal.

The x-axis represents a frequency value in Hz. FIG. 5*c* only shows the simulation result in a frequency range of 30 to 120 Hz. The y-axis represents a contrast of a sound pressure level (SPL) between two sound zones in dBA.

The short dashed line represents the contrast of sound pressure level between the sound zone A and the sound zone B1 of FIG. 5*a*.

The dotted line represents the contrast of sound pressure level between the sound zone A and the sound zone B2 of FIG. 5*a*.

The simulation is performed based on the measured transmission paths from the six actuators 1-1, 1-2, . . . ,1-5, 1-6, to the eight error sensors 2-1, 2-2, . . . , 2-7, 2-8, as shown in FIG. 5*b*.

Based on the arrangement of the six actuators 1-1, 1-2, . . . ,1-5, 1-6 and the eight error sensors 2-1, 2-2, . . . , 2-7, 2-8 as shown in FIG. 5*b*, the set of actuator generation coefficients $kg_k$, the set of actuator exclusion coefficients $ke_k$, and the set of sensor weighting coefficients $me_m$ used in the simulation can be expressed as the matrices $K_g$, $K_e$, and $M_e$, respectively. The matrices $K_g$, $K_e$, and $M_e$, may be diagonal matrices comprising only elements of zeros (0s) and ones (1s).

The actuator exclusion matrices $K_g$ used may be $$K_g = \begin{bmatrix} 1 & & & & & \\ & 0 & & (0) & & \\ & & 0 & & & \\ & & & 0 & & \\ & (0) & & & 0 & \\ & & & & & 0 \end{bmatrix}$$

The actuator exclusion matrices $K_e$ used may be:

$$K_e = \begin{bmatrix} 0 & & & & & \\ & 1 & & (0) & & \\ & & 1 & & & \\ & & & 1 & & \\ & (0) & & & 1 & \\ & & & & & 0 \end{bmatrix}$$

The sensor weighting matrices $M_e$, used may be:

$$M_e = \begin{bmatrix} 1 & & & & & & & \\ & 0 & & & & (0) & & \\ & & 0 & & & & & \\ & & & 0 & & & & \\ & & & & 1 & & & \\ & & & & & 1 & & \\ & (0) & & & & & 0 & \\ & & & & & & & 0 \end{bmatrix}$$

From the simulation result in FIG. 5*c*, it is clear that in the frequency range about 55-105 Hz, the contrast is at least 10 dB between the bright sound zone A and either one of the dark sound zones B1, B2. Thus, the simulation result shown in FIG. 5*c* demonstrates that the sound zones created by the proposed method satisfy the perceptual requirement of at least 10 dB contrast, in the frequency range about 55-105 Hz.

Also, the contrast of sound pressure level (SPL) between the bright sound zone A and the dark sound zones B2, i.e. the contrast of sound pressure level between the driver position and the rear passenger position, is larger than that between the bright sound zone A and the dark sound zones B1, i.e. the contrast of sound pressure level between the driver position and the front passenger position.

The coefficients used in the simulation are only zeros (0s) and ones (1s) to verify the inventive concept. The simulation result of FIG. 5*c* can be further improved by having more finely adjusted coefficients rather than zeros (0s) or ones (1s).

At least one set of the set of actuator generation coefficients $kg_k$, the set of actuator exclusion coefficients $ke_k$, and the set of sensor weighting coefficients $me_m$, may be determined by an optimization process.

The optimization process may comprise: determining a plurality of monitor locations within the acoustic cavity; determining, for each of the acoustic transmission paths from each actuator to each monitor location, a respective transfer function; wherein at least one monitor location is arranged within each of the plurality of sound zones.

The transfer function is defined as a mathematical relation between a sound source and a response, e.g., from an actuator to a monitor location, or an error sensor. An acoustic transmission path therebetween can be fully characterised based on the transfer function.

The monitor locations may be determined to be at a head or an ear position of a person within a sound zone, such as a head or an ear position of a driver or a passenger of a vehicle.

A monitor sensor, e.g., a microphone, may be provided at each of the plurality of monitor locations. The respective transfer function may be determined by measuring a response at the monitor location.

Said determining the respective transfer function by measuring may comprise: driving at least one of the plurality of actuators with a signal, preferably a white or pink noise signal, measuring a sound response at at least one of the plurality of monitor location.

The monitor sensors may be used to measure a sound response at the head or the ear position of the person within the sound zone. The monitor sensors may be used only during the optimization process. That is, the monitor sensors may not be used for creating a plurality of sound zones within the acoustic cavity.

Alternatively, one or more of the monitor sensors may also be used as the error sensors for creating a plurality of sound zones within the acoustic cavity.

The respective transfer function may be determined by simulation. No monitor sensor is needed for simulation.

The optimization process may comprise determining the set of actuator generation coefficients $kg_k$ for generating a first sound at a first monitor location arranged within the desired sound zone, wherein a first value representing the first sound is greater than a first threshold. The first value may be a squared pressure level of the first sound, expressed as $\langle d_{monitors}^2 \rangle_{\sigma_b}$. The first threshold may be a value representing a minimal sound desired to be detected at a monitor location within the desire sound zone. That is, it is to determine the set of actuator generation coefficients $kg_k$ so that a big enough sound can be generated in the desired sound zone.

Preferably, the set of actuator generation coefficients $kg_k$ may be determined to maximise the first value. That is, to make the first value as great as possible.

The optimization process may comprise determining the set of actuator generation coefficients $kg_k$ for generating a second sound at a second monitor location arranged outside the desired sound zone, wherein a second value representing the second sound is smaller than a second threshold. The second value may be a squared pressure level of the second sound, expressed as $\langle d_{monitors}^2 \rangle_{\sigma_d}$. The second threshold may be a value representing a maximal sound to be detected at a monitor location outside the desire sound zone. Thus, it is to determine the set of actuator generation coefficients $kg_k$ so that a small enough sound can be generated outside the desired sound zone. That is, it is to generate less sound to be cancelled.

Preferably, the set of actuator generation coefficients $kg_k$ may be determined to minimise the second value. That is, to reduce the second value to a smallest possible amount.

It is known that, for a low frequency sound, it is not possible to completely isolate the bright sound zones from the dark sound zones. That is, a reduction of a sound level of a low frequency sound in the dark sound zones will unavoidably affect a sound level of the low frequency sound in the bright sound zones as well.

The coefficients $me_m$ and/or $ke_k$ may be chosen so that by an optimal control of a sound field at the error sensors, a minimum squared value of an error signal at the monitor positions can be achieved in the dark sound zones $\sigma_d$, while keeping as much as possible the desired signal amplitude at the monitor positions in the bright sound zone $\sigma_b$.

The optimization process may comprise determining a set of coefficients $me_m$ and/or $ke_k$ that minimize the following function $$\langle e_{monitors}^2\rangle_{\sigma_d}+\alpha\langle |e_{monitors}-d_{monitors}|^2\rangle_{\sigma_b}.$$

$\langle e_{monitors}^2\rangle_{\sigma_d}$ may refer to a squared pressure level of a sound in the dark sound zones, which is generated by the actuators, along with the generation of the desired sound in the bright sound zone A. The sound may represent a resulting sound generated outside the desired sound zone, by the plurality of the actuators. That is, the sound is undesired, which needs to be cancelled or at least reduced. Thus, minimising $\langle e_{monitors}^2\rangle_{\sigma_d}$ means to minimise the resulting sound generated outside the desired sound zone.

$\alpha\langle |e_{monitors}-d_{monitors}|^2\rangle_{\sigma_b}$ may refer to an amount of sound reduction within the bright sound zone A. $\alpha\langle |e_{monitors}-d_{monitors}|^2\rangle_{\sigma_b}$, may represent an amount of a sound reduction in the desired sound zone, caused by a sound generated for cancelling the third sound. Thus, minimising $\alpha\langle |e_{monitors}-d_{monitors}|^2\rangle_{\sigma_b}$ means to keep the sound reduction in the bright zone as little as possible. α may be a weighting factor which weighs these two aspects. α may be used for controlling how much a bright sound zone may be affected by the method/system. α may be any positive real number. For any determined set of actuator generation matrix $K_g$, actuator exclusion matrix $K_e$ and sensor weighting matrix $M_e$, and for a known broadband input signal x, such as a broadband signal, the following equation $$M_e e=M_e[S]K_g x+M_e[S]K_e Y$$

has a solution for y denoted $y_{opt}$ that minimizes $M_e$e in a least-square sense.

Figure 6A:
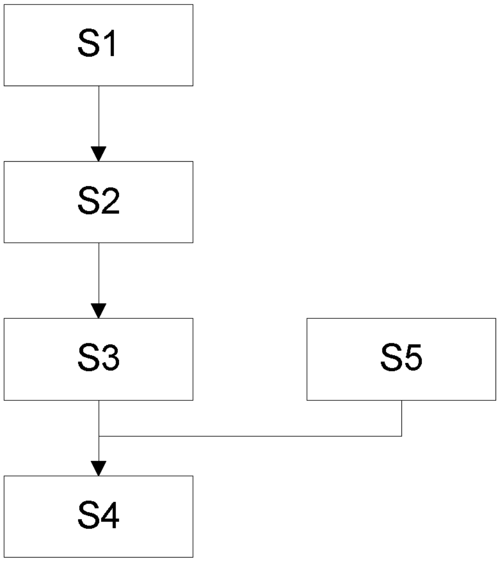
FIG. 6*a* is an example of a process diagram for determining a set of actuator generation coefficients $kg_k$, a set of actuator exclusion coefficients $ke_k$, and a set of sensor weighting coefficients $me_m$, for a sound zone.

Based on the solution $y_{opt}$ and information of the transmission paths from each of the actuators to each of the monitor sensors, an optimal cancelling signal can be obtained at each of the monitor locations or monitor sensors. By summing the optimal cancelling signal with the disturbance signal $d_{monitors}$, the error signal $e_{monitors}$ can be obtained at the monitor sensors. FIG. 6*a* is an example of a process diagram for determining the set of actuator generation coefficients $kg_k$, the set of actuator exclusion coefficients $ke_k$, and the set of sensor weighting coefficients $me_m$, for a sound zone.

In S1, a secondary path model S representing the acoustic transmission paths from all potential actuator positions to all potential error sensor positions and all monitor positions within the acoustic cavity are determined, by measuring or simulation.

Figure 6B:
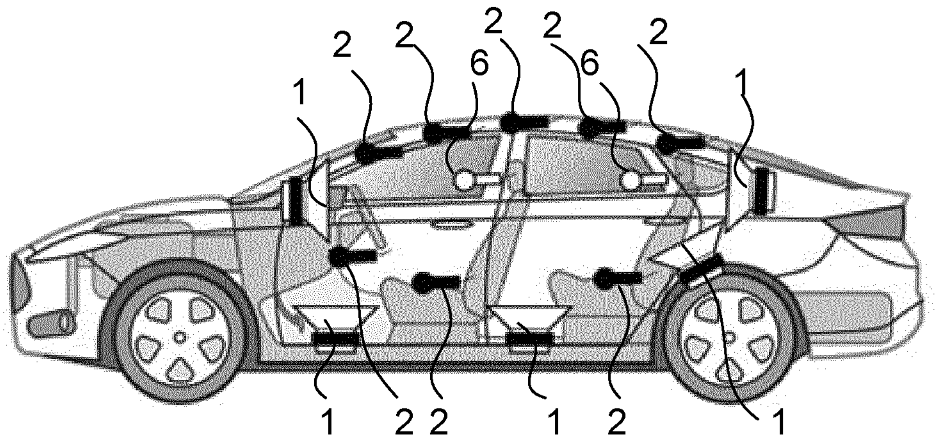
FIG. 6*b*-6*d* are examples of a vehicle provided with actuators and sensors according to the process diagram of FIG. 6*a*.

FIG. 6*b* is an example illustrating the potential positions for actuators 1, for error sensors 2, and for monitor sensors 6, within a vehicle, as in S1. The monitor sensors may be provided at a head or ear position of a person, such as a driver or a passenger, as shown in FIG. 6*b*.

In S2, the actuator positions, the error sensor positions are determined for an optimal control for all sound zones within the acoustic cavity, based on the determined secondary path model S.

The actuators and error sensors may be provided in the acoustic cavity according to the respective determined positions.

Figure 6C:
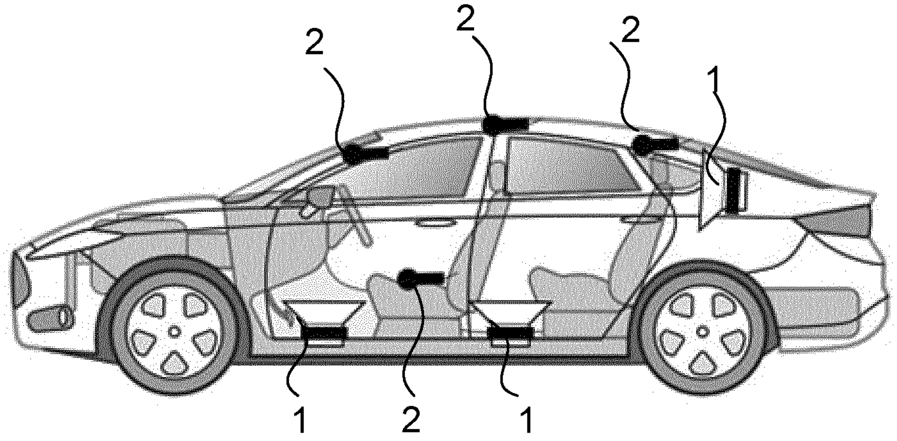

FIG. 6*c* is an example illustrating the vehicle of FIG. 6*b* with the actuators 1 and error sensors 2 provided on the determined positions.

In S3, the set of actuator generation coefficients $kg_k$, the set of actuator exclusion coefficients $ke_k$, and the set of sensor weighting coefficients $me_m$, are determined for each sound zone.

Figure 6D:
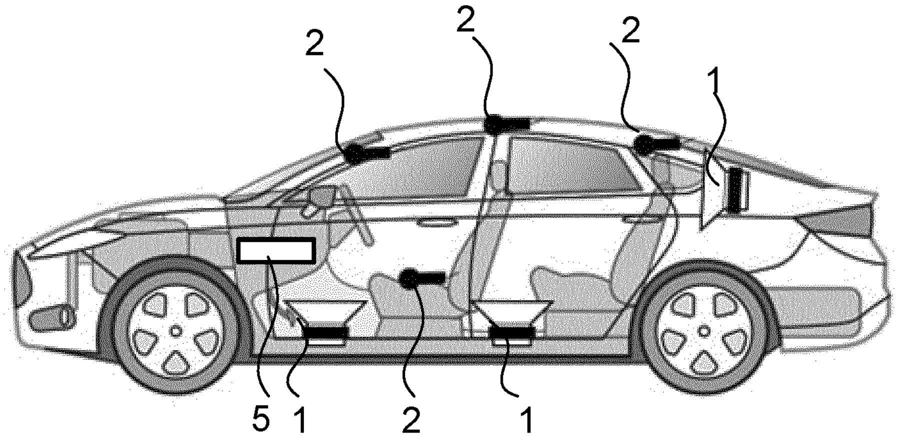

In S4, the coefficients determined in S3 are stored in a storage unit 5. The storage unit 5 may be provided within the vehicle, as shown in FIG. 6*d*. Alternatively, the storage unit 5 may be provided outside the vehicle, e.g., as a cloud storage unit.

In S5, when the respective static filter is used in the method/system, the respective static filter is calibrated for each sound zone. Then the respective static filter calibration result may be stored in the storage unit 5 in S4.

Figure 7:
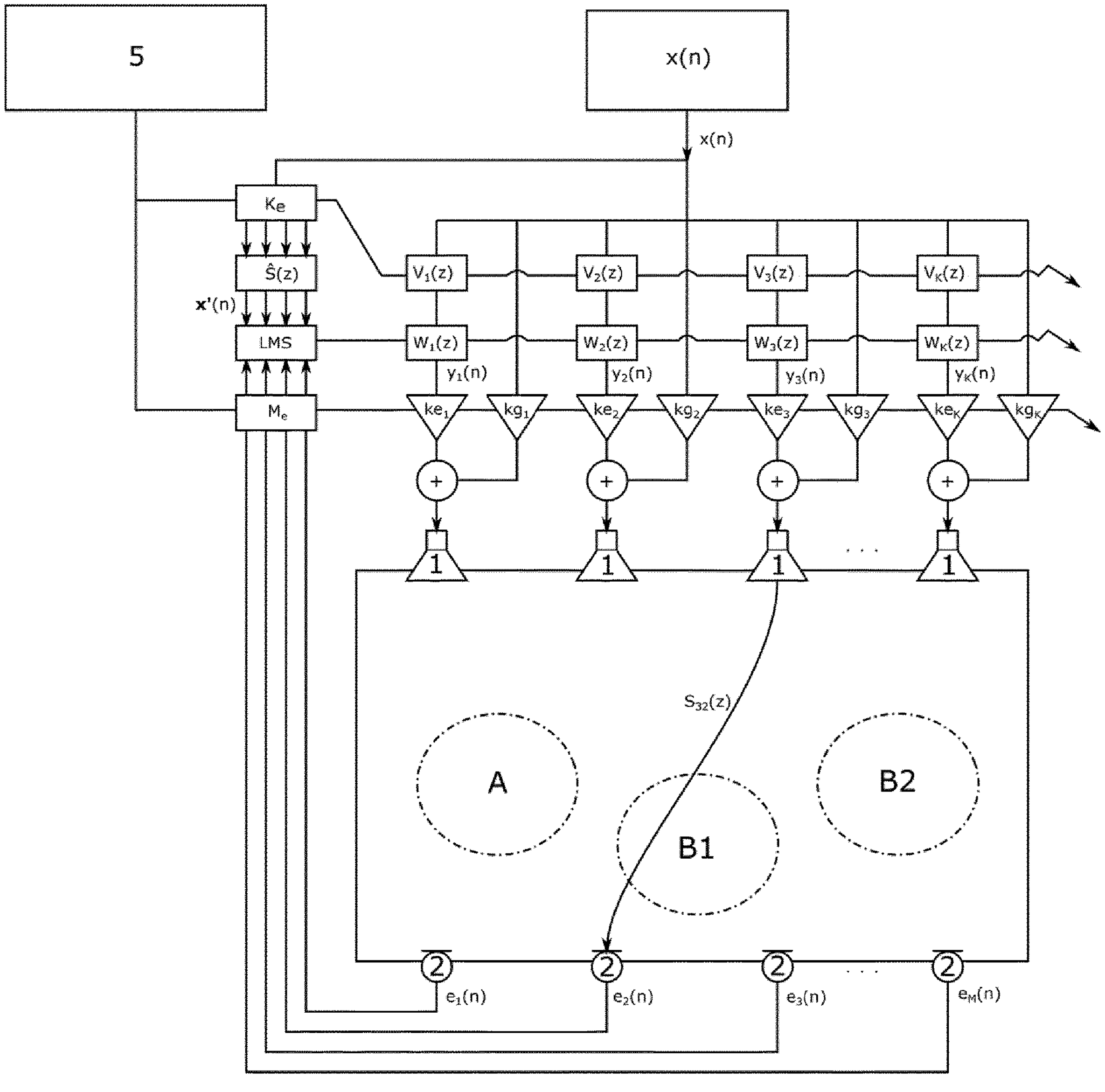
FIG. 7 is an example of a diagram of a method for creating a plurality of sound zones within an acoustic cavity.

FIG. 7 is an example of a method for creating a plurality of sound zones within an acoustic cavity. Comparing with FIG. 4, the method further comprises determining a desired sound zone, and retrieving the determined set of actuator generation coefficients $kg_k$, the determined set of actuator exclusion coefficients $ke_k$, and the determined set of sensor weighting coefficients $me_m$, based on the determined sound zone, from e.g., the storage unit 5. The storage unit 5 may be provided within the vehicle, or outside the vehicle.

The invention claimed is:

1. A method for creating a plurality of sound zones within an acoustic cavity, comprising:

providing a plurality of actuators within the acoustic cavity, each for generating a respective acoustic output in response to a respective drive signal, providing, for each of the plurality of actuators, an adaptive filter for receiving a respective input signal, and generating a respective output signal, providing, for each of the adaptive filters, at least one filter coefficient, providing a plurality of error sensors within the acoustic cavity, each for generating a respective error signal e, representing a respective sound detected by the respective error sensor, providing an audio data signal x(n) for generating a desired sound in a desired sound zone of the plurality of sound zones, providing, for the desired sound zone, a set of actuator generation coefficients $kg_k$, a set of actuator exclusion coefficients $ke_k$, wherein k refers to a $k_{th}$ actuator, k=1, 2, 3 . . . , and a set of sensor weighting coefficients $me_m$ wherein m refers to a $m_{th}$ error sensor, m=1, 2, 3 . . . ;

wherein each of the adaptive filters receives the provided audio data signal x(n) as the input signal, and generates a respective output signal y(n) based on the input signal and the at least one filter coefficient;

providing, for each of the plurality of actuators, the respective drive signal for generating the respective acoustic output, comprising:

generating a respective generation input signal, based on the set of actuator generation coefficients $kg_k$ and the provided audio data signal x(n);

generating a respective exclusion input signal, based on the set of actuator exclusion coefficients $ke_k$ and the respective output signal y(n);

generating the respective drive signal based on the respective generation input signal and the respective exclusion input signal; and generating, for each of the adaptive filters, at least one respective updated filter coefficient, comprising:

generating a respective weighted error signal, based on the set of sensor weighting coefficients $me_m$ and the respective error signal e;

generating a reference signal x'(n) based on the provided audio data signal x(n) the set of actuator exclusion coefficients $ke_k$, and a secondary sound path model $\hat{S}$ representing a plurality of acoustic transmission paths from each of the plurality of actuators to each of the plurality of error sensor; generating the respective updated filter coefficient based on the respective weighted error signal and the reference signal x'(n), to reduce the respective weighted error signal.

2. The method for creating a plurality of sound zones within an acoustic cavity as claimed in claim 1, wherein at least one set of the set of actuator generation coefficients $kg_k$, the set of actuator exclusion coefficients $ke_k$, and the set of sensor weighting coefficients $me_m$, is determined by an optimization process.

3. The method for creating a plurality of sound zones within an acoustic cavity as claimed in claim 2, wherein the optimization process comprises:

determining a plurality of monitor locations within the acoustic cavity; and determining, for each of a plurality of acoustic transmission paths from each of the plurality of actuators to each of the plurality of monitor locations, a respective transfer function;

wherein at least one monitor location is arranged within each of the plurality of sound zones.

4. The method for creating a plurality of sound zones within an acoustic cavity as claimed in claim 3, wherein the optimization process further comprises:

providing a monitor sensor at each of the plurality of monitor locations, and determining the respective transfer function by measuring a response at the provided monitor sensor.

5. The method for creating a plurality of sound zones within an acoustic cavity as claimed in claim 4, wherein said determining the respective transfer function by measuring comprises:

driving at least one of the plurality of actuators with a signal, and measuring a response by the provided monitor sensor.

6. The method for creating a plurality of sound zones within an acoustic cavity as claimed in claim 3, wherein the optimization process comprises:

determining the respective transfer function by simulation.

7. The method for creating a plurality of sound zones within an acoustic cavity as claimed in claim 2, wherein the optimization process comprises:

determining the set of actuator generation coefficients $kg_k$ for generating a first sound at a first monitor location arranged within the desired sound zone, wherein a first value representing the first sound is greater than a first threshold.

8. The method for creating a plurality of sound zones within an acoustic cavity as claimed in claim 2, wherein the optimization process comprises:

determining the set of actuator generation coefficients $kg_k$ for generating a second sound at a second monitor location arranged outside the desired sound zone, wherein a second value representing the second sound is smaller than a second threshold.

9. The method for creating a plurality of sound zones within an acoustic cavity as claimed in claim 2, wherein the optimization process comprises:

determining the set of actuator exclusion coefficients $ke_k$, and the set of sensor weighting coefficients $me_m$, by minimising the following function $$<e_{monitors}{}^2>_{\sigma_d}+\alpha<|e_{monitors}-d_{monitors}|^2>_{\sigma_b},$$

wherein $<e_{monitors}{}^2>_{\sigma_d}$ refers to a squared pressure level of a third sound outside the desired sound zone, generated by the plurality of the actuators;

wherein $\alpha<|e_{monitors}-d_{monitors}|^2>_{\sigma_b}$ refers to a squared pressure level difference between a fourth sound within the desired sound zone and the first sound within the desired sound zone; and wherein $\alpha$ is a weighting factor, which is a positive real number.

10. The method for creating a plurality of sound zones within an acoustic cavity as claimed in claim 1 comprising providing, for each of the plurality of sound zones, a respective set of actuator generation coefficients $kg_k$, a respective set of actuator exclusion coefficients $ke_k$, and a respective set of sensor weighting coefficients $me_m$.

11. The method for creating a plurality of sound zones within an acoustic cavity as claimed in claim 1, wherein at least one set of the provided set of actuator generation coefficients $kg_k$, the set of actuator exclusion coefficients $ke_k$, and the set of sensor weighting coefficients $me_m$, is stored in a storage unit.

12. The method for creating a plurality of sound zones within an acoustic cavity as claimed in claim 1, further comprising providing a respective static filter for receiving the provided audio data signal x(n), and generating a respective filtered signal in response to the provided audio data signal x(n), wherein each of the adaptive filters receives the respective filtered signal as the input signal, and generates a respective output signal y(n) based on the input signal and the at least one filter coefficient.

13. The method for creating a plurality of sound zones within an acoustic cavity as claimed in claim 1, wherein each of the adaptive filters comprises a respective static filter for receiving the provided audio data signal x(n), and generating a respective filtered signal in response to the provided audio data signal x(n), and wherein each of the adaptive filters receives the respective filtered signal as the input signal and generates a respective output signal y(n) based on the input signal and the at least one filter coefficient.

14. The method for creating a plurality of sound zones within an acoustic cavity as claimed in claim 12, wherein the respective static filter is determined by a calibration or by a simulation.

15. The method for creating a plurality of sound zones within an acoustic cavity as claimed in claim 1, wherein the respective generation input signal is generated by applying the set of actuator generation coefficients $kg_k$ to the provided audio data signal x(n); and/or wherein the respective exclusion input signal is generated by applying the set of actuator exclusion coefficients $ke_k$ to the respective output signal y(n); and/or wherein the respective weighted error signal is generated by applying the set of sensor weighting coefficients $me_m$ to the respective error signal e.

16. The method for creating a plurality of sound zones within an acoustic cavity as claimed in claim 1, wherein the reference signal x'(n) is generated by applying the secondary sound path model $\hat{S}$, and applying the set of actuator exclusion coefficients $ke_k$ to the provided audio data signal x(n), $$x_{km}'=ke_k\hat{S}_{km}*x.$$

17. The method for creating a plurality of sound zones within an acoustic cavity as claimed in claim 1, wherein the provided audio data signal x(n) has a frequency range of 20 to 400 Hz.

18. The method for creating a plurality of sound zones within an acoustic cavity as claimed in claim 1, wherein the generated at least one respective updated filter coefficient at a time step n+1 is expressed as $$W_k(n+1)=W_k(n)-\mu\Sigma_{m=1}^{M}x'_{km}(n)e'_m(n),$$

wherein $W_k(n)$ represents the respective filter coefficient at a time step n, $x'_{km}(n)$ represents a reference audio signal;

$e'_m(n)$ represents the weighted error signal; and

μ is a step size.

19. The method for creating a plurality of sound zones within an acoustic cavity as claimed in claim 18, wherein the reference signal $x'_{km}(n)$ is generated based on the provided audio data signal x(n), the set of actuator exclusion coefficients $ke_k$, and the secondary sound path model $\hat{S}$.

20. The method for creating a plurality of sound zones within an acoustic cavity as claimed in claim 19, wherein the reference signal $x'_{km}(n)$ is expressed as:

$$x'_{km}=k_e k\hat{S}_{km}*x.$$

21. The method for creating a plurality of sound zones within an acoustic cavity as claimed in claim 1, further comprising updating at least one set of the set of actuator generation coefficients $kg_k$, the set of actuator exclusion coefficients $ke_k$, and the set of sensor weighting coefficients $me_m$, for the desired sound zone.

22. The method for creating a plurality of sound zones within an acoustic cavity as claimed in claim 21, wherein said updating is performed by a learning process.

23. A system for creating a plurality of sound zones within an acoustic cavity, comprising:

a plurality of actuators within the acoustic cavity, each configured to generate a respective acoustic output in response to a respective drive signal, an adaptive filter operatively connected to each of the plurality of actuators, configured to receive a respective input signal, and generate a respective output signal, wherein each of the adaptive filters is provided with at least one filter coefficient, a plurality of error sensors within the acoustic cavity, each configured to generate a respective error signal e, representing a respective sound detected by the respective error sensor, a control unit, configured to:

receive an audio data signal x(n) for generating a desired sound in a desired sound zone of the plurality of sound zones, and provide, for the desired sound zone, a set of actuator generation coefficients $kg_k$, a set of actuator exclusion coefficients $ke_k$, wherein k refers to a $k_{th}$ actuator, k=1, 2, 3 . . . , and a set of sensor weighting coefficients $me_m$ wherein m refers to a $m_{th}$ error sensor, m=1, 2, 3 . . . ;

wherein each of the adaptive filters is configured to receive the provided audio data signal x(n) as the input signal, and to generate a respective output signal y(n) based on the input signal and the at least one filter coefficient;

the control unit is further configured to:

provide, for each of the plurality of actuators, the respective drive signal for generating the respective acoustic output, wherein the control unit is further configured to:

generate a respective generation input signal, based on the set of actuator generation coefficients $kg_k$ and the provided audio data signal x(n);

generate a respective exclusion input signal, based on the set of actuator exclusion coefficients $ke_k$ and the respective output signal y(n);

generate the respective drive signal based on the respective generation input signal and the respective exclusion input signal; and generate, for each of the adaptive filters, at least one respective updated filter coefficient;

generate a respective weighted error signal, based on the set of sensor weighting coefficients $me_m$ and the respective error signal e;

generate a reference signal x'(n) based on the provided audio data signal x(n), the set of actuator exclusion coefficients $ke_k$, and a secondary sound path model $\hat{S}$ representing a plurality of acoustic transmission paths from each of the plurality of actuators to each of the plurality of error sensor; and generate the respective updated filter coefficient based on the respective weighted error signal and the reference signal x'(n), to reduce the respective weighted error signal.

24. The system as claimed in claim 23, wherein the actuator is a loudspeaker, or a vibrating panel, and/or wherein the error sensor is a microphone.

* * * * *